(12) United States Patent
Cheng et al.

(10) Patent No.: US 12,735,175 B1
(45) Date of Patent: Sep. 15, 2026

(54) DRONE BUOYANCY DEVICE

(71) Applicant: METAL INDUSTRIES RESEARCH AND DEVELOPMENT CENTRE, Kaohsiung (TW)

(72) Inventors: Shun-Yuan Cheng, Kaohsiung (TW); Wei-Ching Wang, Kaohsiung (TW); Shuo-Yen Chen, Kaohsiung (TW); Wei-Te Chen, Kaohsiung (TW)

(73) Assignee: METAL INDUSTRIES RESEARCH AND DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 19/415,565

(22) Filed: Dec. 10, 2025

(51) Int. Cl.
*B64U 60/10* (2023.01)
*B64C 25/56* (2006.01)
*B64U 60/30* (2023.01)

(52) U.S. Cl.
CPC .............. *B64C 25/56* (2013.01); *B64U 60/10* (2023.01); *B64U 60/30* (2023.01)

(58) Field of Classification Search
CPC .......... B64C 25/56; B64U 60/10; B64U 60/30
See application file for complete search history.

(56) References Cited

U.S. PATENT DOCUMENTS

2016/0340006 A1* 11/2016 Tang .......................... B63C 9/01
2017/0210451 A1* 7/2017 Oh ............................ B63C 9/01
2017/0217562 A1* 8/2017 Schalla .................. A63H 27/12
2020/0031438 A1* 1/2020 Moses ........................ B63C 9/01

* cited by examiner

*Primary Examiner* — Tye William Abell
(74) *Attorney, Agent, or Firm* — HSML P.C.

(57) ABSTRACT

A drone buoyancy device includes a storage unit and an airbag unit. The storage unit includes a wrapping member that defines a receiving space and that has an opening being in spatial communication with the receiving space and being closable, and a fastening member that is disposed on the wrapping member, that is opposite to the opening, and that is adapted for positioning the wrapping member on a support frame of a drone. The airbag unit is disposed in the receiving space, and includes an inflatable member, an actuating member that is connected to the inflatable member and that is operable for inflating the inflatable member, and a connecting belt that interconnects the inflatable member and the wrapping member.

10 Claims, 6 Drawing Sheets

DRONE BUOYANCY DEVICE

FIELD

The disclosure relates to a buoyancy device, and more particularly to a drone buoyancy device.

BACKGROUND

Referring to FIG. 1, an existing drone buoyancy device 91 is adapted to be mounted to a drone 92 that is operated in a water environment. The drone 92 includes a main body 921 and two landing devices 922 mounted to a bottom side of the main body 921. The existing drone buoyancy device 91 includes two buoyancy tubes 911 respectively mounted to the landing devices 922. In practice, the buoyancy tubes 911 are inflated before takeoff, and provide a buoyancy force to float the drone 92 on the water when the drone 92 accidentally falls into the water, thereby facilitating retrieval of the existing drone 92.

However, to mount the buoyancy tubes 911 to the drone 92, the landing devices 922 need modifications, which is time consuming and increases additional costs. Furthermore, when flying, because the dimensions of the buoyancy tubes 911 are relatively large, the drone 92 may experience wind resistance that affects its flight. Furthermore, if one of the buoyancy tubes 911 is deflated or detached when the drone 92 flies, the left and right heights of the drone 92 may be inconsistent or the weight of the drone 92 may be unbalanced, thereby decreasing the landing success of the drone 92, so there is room for improvement on the existing drone buoyancy device 91.

SUMMARY

Therefore, an object of the disclosure is to provide a drone buoyancy device that can alleviate at least one of the drawbacks of the prior art.

According to the disclosure, the drone buoyancy device is adapted to be mounted on a drone. The drone includes a main body and a support frame that is disposed under the main body. The drone buoyancy device includes a storage unit and an airbag unit.

The storage unit includes a wrapping member that defines a receiving space and that has an opening being in spatial communication with the receiving space and being closable, and a fastening member that is disposed on the wrapping member, that is opposite to the opening, and that is adapted for positioning the wrapping member on the support frame.

The airbag unit is disposed in the receiving space of the storage unit, and includes an inflatable member, an actuating member that is connected to the inflatable member and that is operable for inflating the inflatable member, and a connecting belt that interconnects the inflatable member and the wrapping member.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
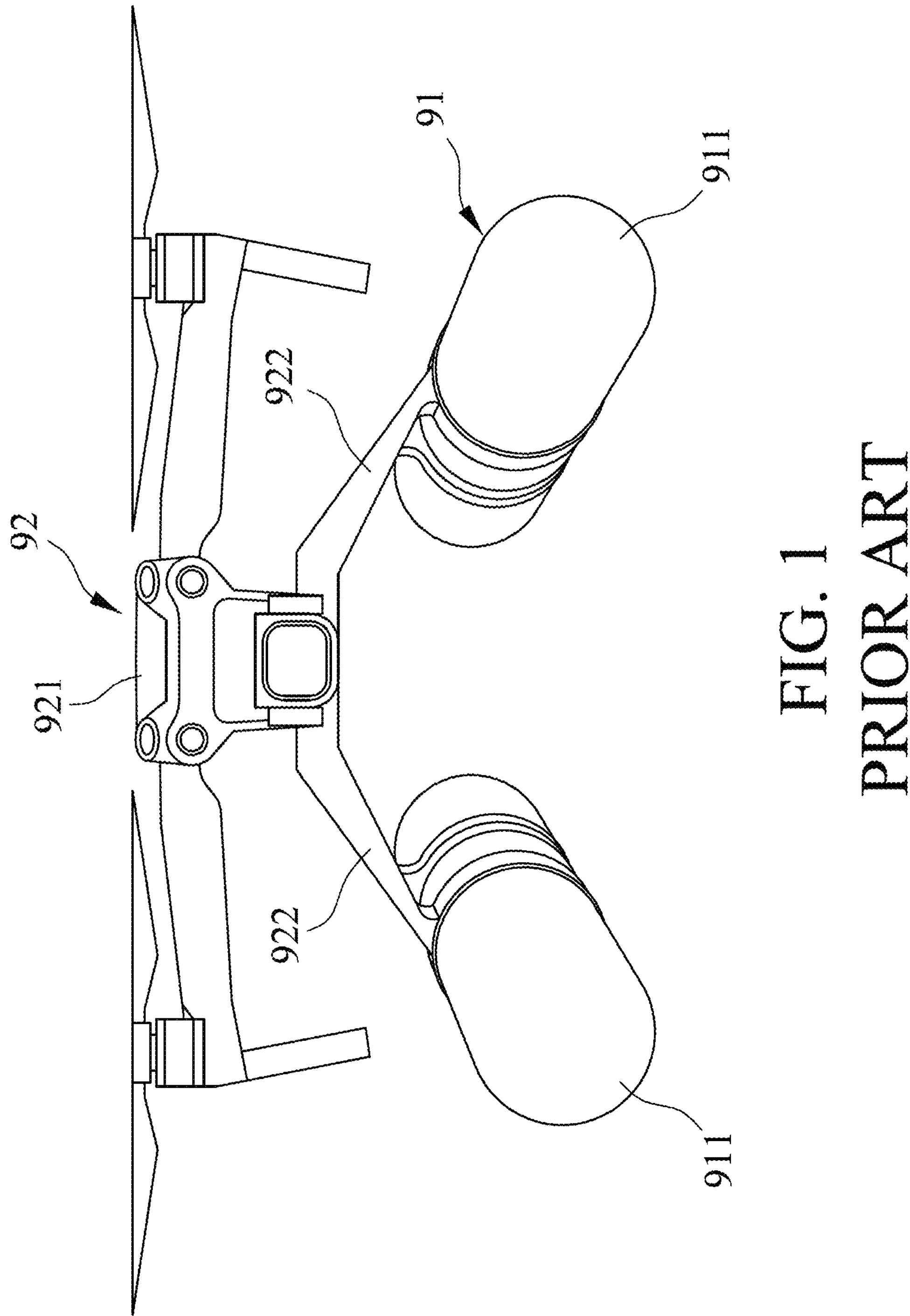
FIG. 1 is a front view illustrating an existing drone buoyancy device mounted to a drone.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
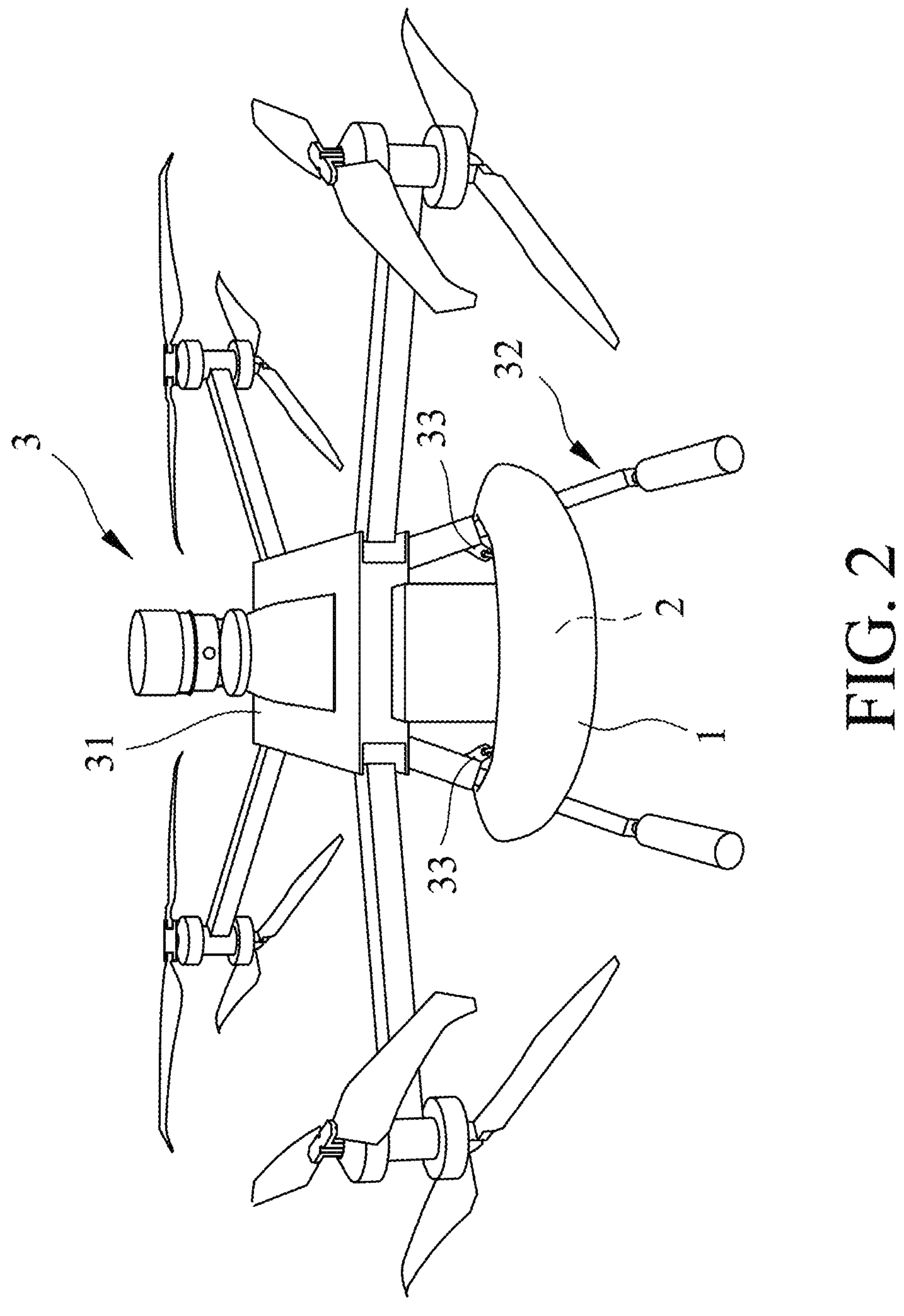
FIG. 2 is a front view illustrating an embodiment of a drone buoyancy device according to the disclosure.

Referring to FIG. 2, an embodiment of a drone buoyancy device according to the disclosure is adapted to be mounted on a drone 3, and includes a storage unit 1 and an airbag unit 2. The drone 3 includes a main body 31, a support frame 32 that is disposed under the main body 31, and a plurality of attaching members 33 that are disposed on the support frame 32. In this embodiment, the drone 3 is operated in a water environment and may be at risk of falling into the water. Furthermore, the type of the drone 3 is not limited hereto as long as a structure of the support frame 32 is included to allow mounting of the drone buoyancy device of the disclosure.

Figure 3:
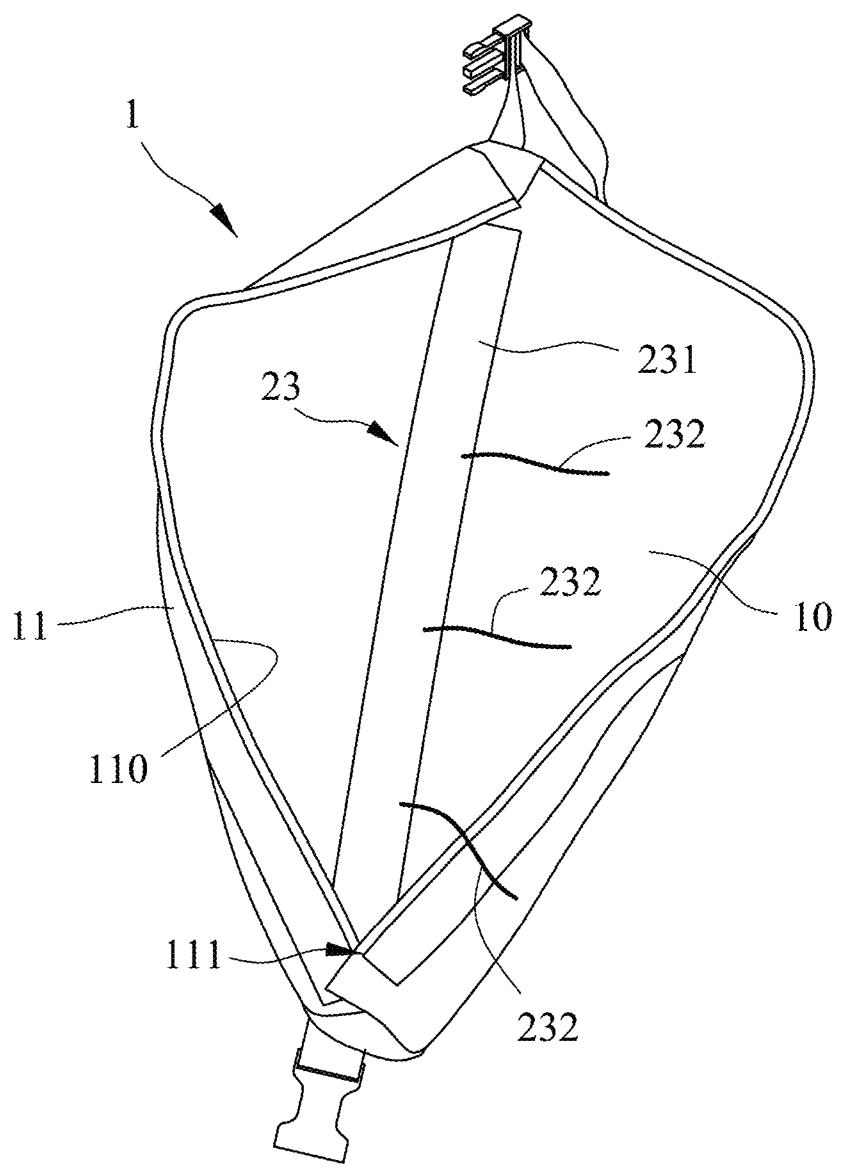
FIG. 3 is a perspective view of the embodiment illustrating a connecting belt and a storage unit of the drone buoyancy device.
Figure 4:
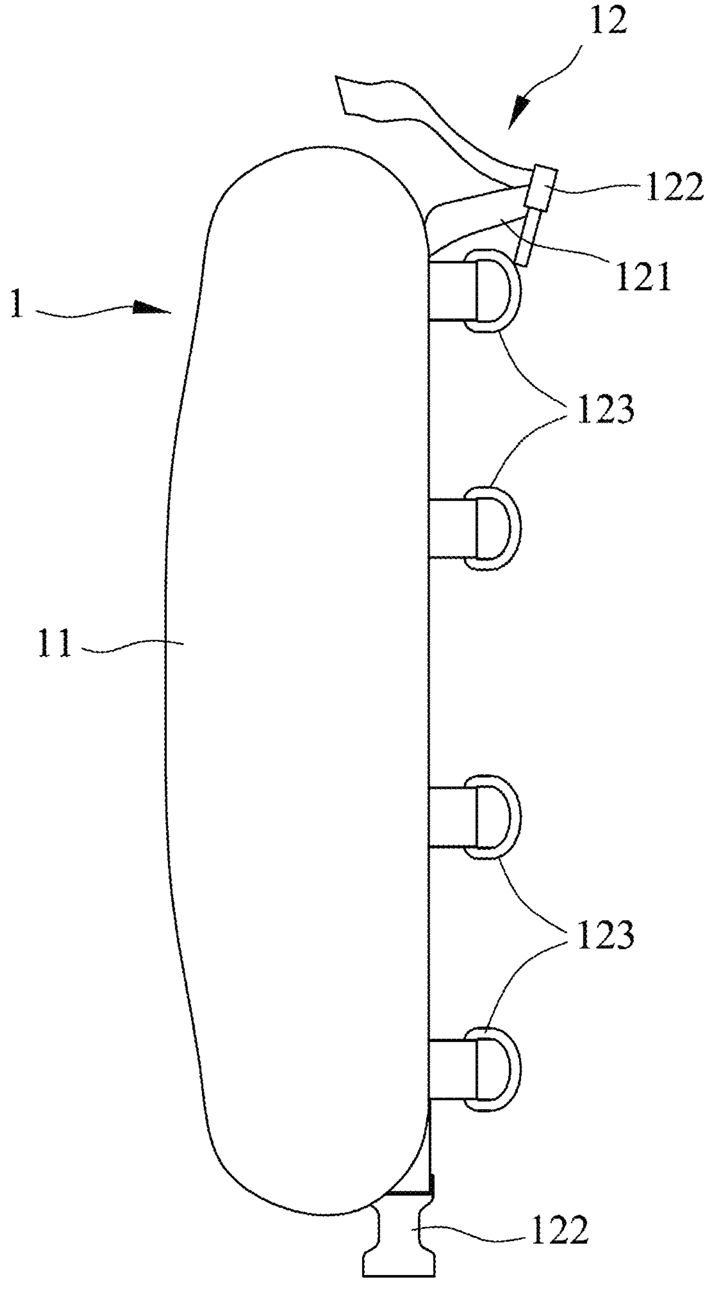
FIG. 4 is a perspective view of the embodiment illustrating a wrapping member and a fastening member of the storage unit of the drone buoyancy device.

Referring to FIGS. 3 and 4 in combination with FIG. 2, the storage unit 1 is adapted to be removably disposed on the support frame 32, and includes a wrapping member 11 and a fastening member 12. The wrapping member 11 defines a receiving space 10 and has an opening 110 that is in spatial communication with the receiving space 10 and that is closable. The fastening member 12 is disposed on the wrapping member 11, is opposite to the opening 110, and is adapted for positioning the wrapping member 11 on the support frame 32. In particular, the wrapping member 11 is designed in the form of a round shape, and is made of neoprene. Consequently, the wrapping member 11 may be lightweight and air-permeable. The round shape of the wrapping member 11 may effectively reduce wind resistance on the wrapping member 11 mounted to the drone 3 so as to minimize interference during flight, takeoff, and landing of the drone 3. By virtue of being made of neoprene, the wrapping member 11 may float on the water, and may be resistant to corrosion caused by salt water and aging caused by ultraviolet light to prolong the durability thereof in the water environment. In this embodiment, the wrapping member 11 further has a hook-and-loop element 111 that is disposed adjacent to the opening 110 for closing the opening 110. By virtue of the hook-and-loop element 111 that opens or closes the opening 110, the airbag unit 2 (details of which will be described hereinafter) may be conveniently disposed in the receiving space 10 of the storage unit 1.

As shown in FIG. 4, the fastening member 12 of the storage unit 1 includes a belt part 121 that is disposed on the wrapping member 11, two buckle parts 122 that are disposed respectively on two ends of the belt part 121, and a plurality of ring parts 123 that are spaced apart from each other and that are disposed on the belt part 121. The buckle parts 122 are operable to be coupled to each other to position the wrapping member 11 on the support frame 32. After the wrapping member 11 is positioned on the support frame 32, a length of the belt part 121 is adjustable. By virtue of the length of the belt part 121 being adjustable, the fastening member 12 may correspond to different sizes of the support frames 32. The ring parts 123 are adapted to be respectively engaged with a plurality of hook members 33 of the drone 3 when the buckle parts 122 are coupled to each other, thereby limiting rotation of the wrapping member 11 and enhancing stability of the wrapping member 11 positioned on the support frame 32 of the drone 3. As a result, because the fastening member 12 may correspond to the different types of the drone 3, the wrapping member 11 may be quickly mounted. Furthermore, the removable feature of the fastening member 12 allows the storage unit 1 to be reused.

Figure 5:
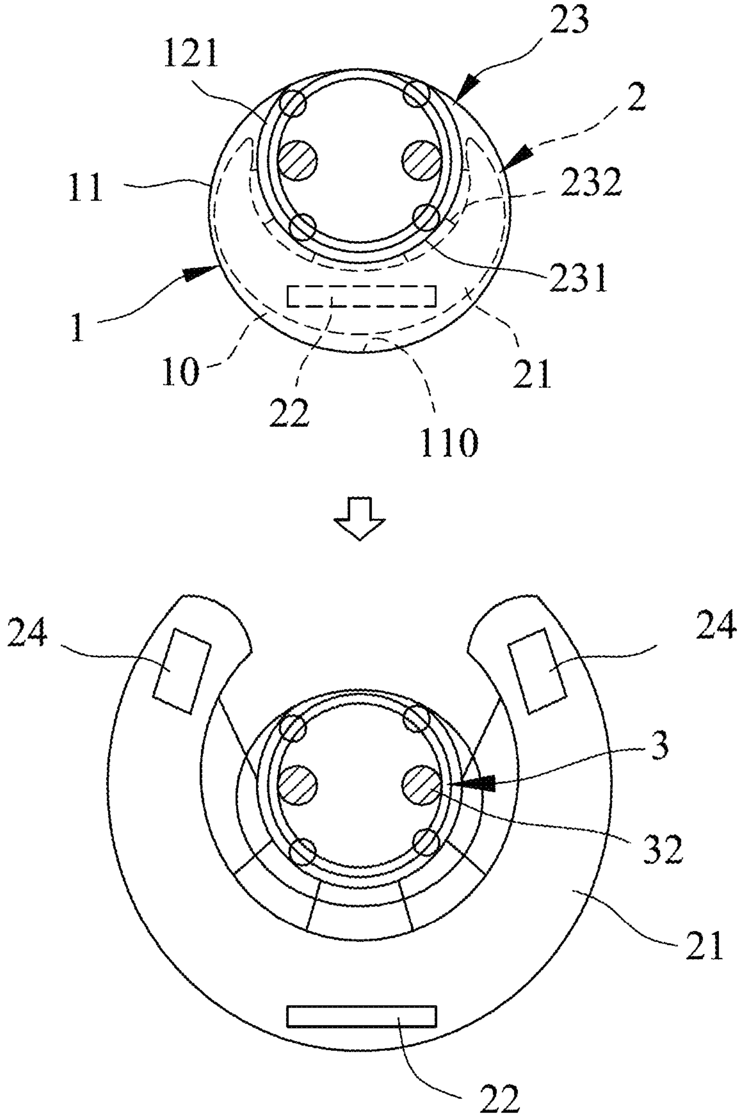
FIG. 5 is a schematic view illustrating an inflation process of an airbag unit relative to the storage unit of the drone buoyance device.
Figure 6:
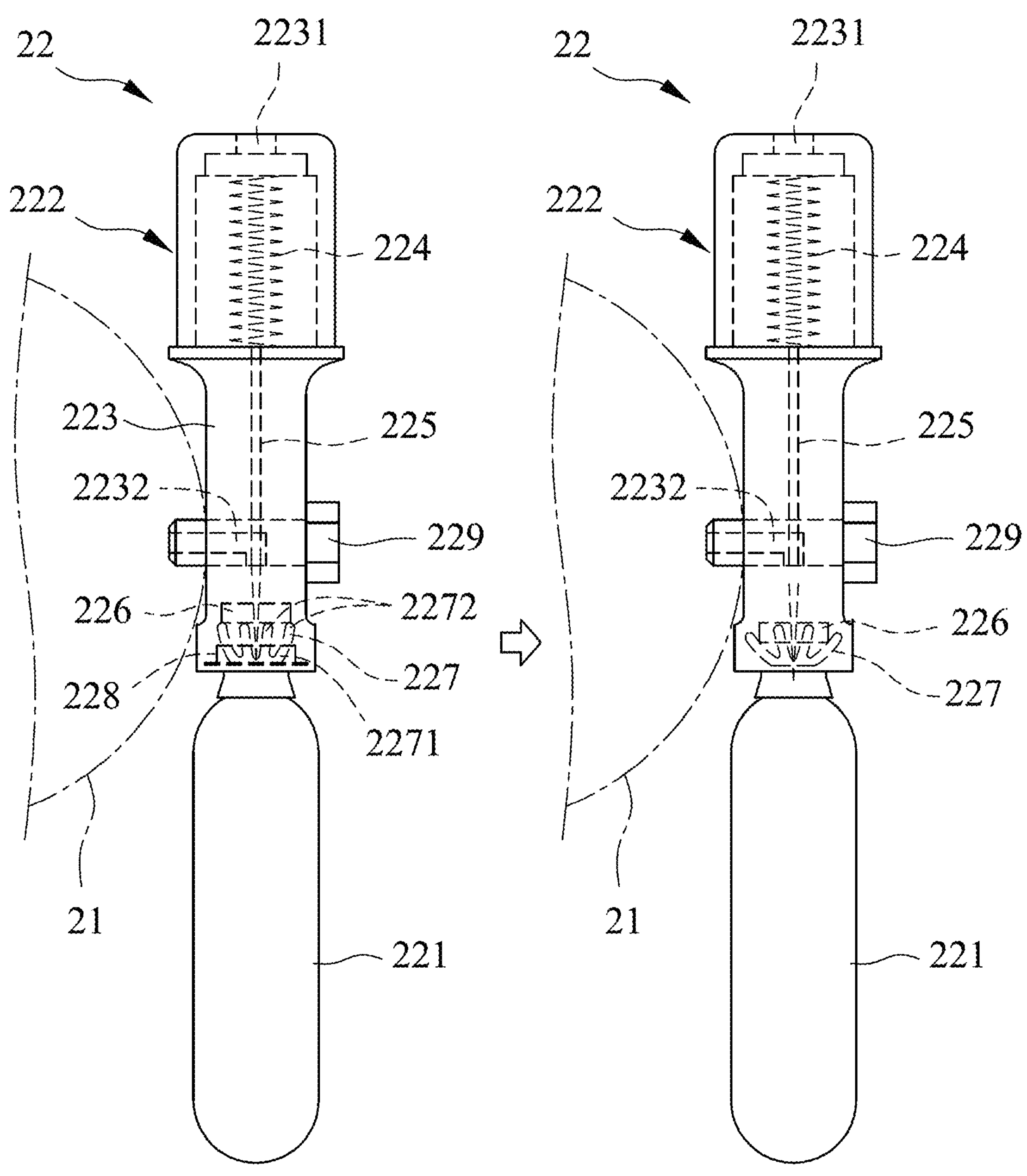
FIG. 6 is a schematic view illustrating a gas discharge process of an actuating member of the airbag unit of the drone buoyancy device.

Referring to FIGS. 5 and 6 in combination with FIG. 3, the airbag unit 2 includes an inflatable member 21, an actuating member 22, two reflective member 24, and a connecting belt 23. The inflatable member 21 is disposed in the receiving space 10 of the storage unit 1. The actuating member 22 is connected to a middle portion of the inflatable member 21 and is operable for inflating the inflatable member 21. The reflective member 24 is disposed on the inflatable member 21 for enhancing visibility of the inflatable member 21. The connecting belt 23 is disposed in the receiving space 10, interconnects the inflatable member 21 and the wrapping member 11, and is parallel to the belt part 121 of the fastening member 12. In this embodiment, the actuating member 22 includes a gas cylinder 221, and a gas outlet portion 222 that is formed with a through hole 2232 being in spatial communication with an interior of the inflatable member 21. The gas outlet portion 222 is operable for introducing a gas in the gas cylinder 221 to flow into the interior of the inflatable member 21 via the through hole 2232. The connecting belt 23 has a main body portion 231 that is disposed in the receiving space 10 in position parallel with the belt part 121 of the fastening member 12, and a plurality of extension portions 232 that are spaced apart from each other and that are connected to the inflatable member 21. When the two buckle parts 122 are coupled to each other to position the wrapping member 11 on the support frame 32, the belt part 121 and the main body portion 231 concentrically surround the support frame 32. As shown in FIG. 5, by virtue of the plurality of extension portions 232 of the connecting belt 23 connected to the inflatable member 21, the inflatable member 21 concentrically surrounds the main body portion 231. Through this, during mounting the drone buoyancy device, a user may anticipate and adjust a position of the inflatable member 21 after the inflatable member 21 is inflated to expand. In addition, each of the reflective members 24 is a reflective strip and has a color such as fluorescent yellow, fluorescent green or any other easily visible color, so that the drone 3 may be conveniently retrieved when falling into the water. The gas cylinder 221 may store a compressed carbon dioxide gas, and the compressed carbon dioxide gas may be introduced by the gas outlet portion 222 into the gas cylinder 221.

Specifically, in this embodiment, the gas outlet portion 222 of the actuating member 22 includes a housing 223, a communication rod 229, a spring 224, a needle 225, a limit block 226, a limit claw 227, and a water-soluble tablet 228. The housing 223 is formed with a water inlet hole 2231. The communication rod 229 extends through the housing 223, is connected to the inflatable member 21, and is formed with the through hole 2232. The spring 224 is disposed in the housing 223 to generate a resilient force toward the gas cylinder 221. The needle 225 is connected to the spring 224 and extends toward the gas cylinder 221. The limit block 226 is sleeved on the needle 225. The limit claw 227 is disposed at a junction of the housing 223 and the gas cylinder 221. The water-soluble tablet 228 is connected to the limit claw 227. The limit claw 227 includes a base seat 2271 that is disposed at the junction of the housing 223 and the gas cylinder 221, and a plurality of resilient claws 2272 that are spaced apart from each other and extend from the base seat 2271 toward the spring 224.

In this embodiment, the water-soluble tablet 228 is disposed around the plurality of resilient claws 2272. The water-soluble tablet 228 is convertible upon interaction with water from a limit state in which the plurality of resilient claws 2272 are bound by the water-soluble tablet 228 so that distal ends of the plurality of resilient claws 2272 cooperatively abut against the limit block 226 to prevent the needle 225 from moving toward the gas cylinder 221 caused by the resilient force of the spring 224, to a dissolved state in which the water-soluble tablet 228 is dissolved in water and the plurality of resilient claws 2272 resiliently spread such that the limit block 226 and the needle 225 are driven by the resilient force of the spring 224 to move toward the gas cylinder 221, thereby permitting the needle 225 to penetrate the gas cylinder 221 with the resilient force of the spring 224. As a result, the carbon dioxide gas in the gas cylinder 221 is released, enters the housing 223, and flows into the inflatable member 21 through the through hole 2232 of the communication rod 229 (as shown in FIG. 6). In contrast to the actuating member 22 being designed to be disposed on an end of the inflatable member 21, in this embodiment, the actuating member 22 is connected to the middle portion of the inflatable member 21, thereby preventing an end of the inflatable member 21 from failing to be inflated (e.g., the gas may not be dispersed from one end of the inflatable member 21 to the other end) due to extrusion or other factors. Because the actuating member 22 is connected to the middle portion of the inflatable member 21, even if an end of the inflatable member 21 is unable to be effectively inflated, the other end of the inflatable member 21 is allowed to be inflated with the gas, thereby providing a sufficient buoyant force to float the drone 3.

Specifically, the communication rod 229 directly extends through the housing 223 into the inflatable member 21, so that the housing 223 and the inflatable member 21 are connected to each other. In this embodiment, the through hole 2232 is a substantially L-shaped flow channel, such that an opening of the through hole 2232 faces the gas cylinder 221, and an opposite opening of the through hole 2232 is disposed in the inflatable member 21, thereby conducting the carbon dioxide gas from the gas cylinder 221 to flow through the housing 223 into the inflatable member 21.

When the water-soluble tablet 228 is in the limit state, the airbag unit 2 is accommodated in the storage unit 1, and the opening 110 is closed by the hook-and-loop element 111. When the drone 3 falls into the water, the water seeps into the receiving space 10 through the fiber gaps of the wrapping member 11, and flows toward the actuating member 22. As the water is introduced into the housing 223 through the water inlet hole 2231 and flows to the water-soluble tablet 228, the water-soluble tablet 228 is dissolved such that the needle 225 penetrates the gas cylinder 221, and the carbon dioxide gas is discharged to inflate the inflatable member 21. Inflation of the inflatable member 21 drives the hook-and-loop element 111 to open the opening 110 of the wrapping member 11 such that the inflatable member 21 is exposed from the wrapping member 11 through the opening 110 and surrounds the drone 3, thereby floating the drone 3 for retrieval of the drone 3.

In summary, by virtue of using the fastening member 12 to quickly fasten the wrapping member 11 to the support frame 32, when the drone 3 falls into the water, the airbag unit 2 in the wrapping member 11 may be inflated to float the drone 3 for the retrieval of the drone 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A drone buoyancy device adapted to be mounted on a drone, the drone including a main body and a support frame that is disposed under the main body, said drone buoyancy device comprising:

- a storage unit including
  - a wrapping member that defines a receiving space and that has an opening being in spatial communication with said receiving space and being closable, and
  - a fastening member that is disposed on said wrapping member, that is opposite to said opening, and that is adapted for positioning said wrapping member on the support frame; and
- an airbag unit disposed in said receiving space of said storage unit, and including
  - an inflatable member,
  - an actuating member that is connected to said inflatable member and that is operable for inflating said inflatable member, and
  - a connecting belt that interconnects said inflatable member and said wrapping member.

2. The drone buoyancy device as claimed in claim 1, wherein said wrapping member is made of neoprene.

3. The drone buoyancy device as claimed in claim 1, wherein said wrapping member further has a hook-and-loop element that is disposed adjacent to said opening for closing said opening.

4. The drone buoyancy device as claimed in claim 1, wherein said airbag unit further includes at least one reflective member that is disposed on said inflatable member for enhancing visibility of said inflatable member.

5. The drone buoyancy device as claimed in claim 1, wherein said actuating member is connected to a middle portion of said inflatable member.

6. The drone buoyancy device as claimed in claim 1, wherein said fastening member of said storage unit includes a belt part that is disposed on said wrapping member, and two buckle parts that are disposed respectively on two ends of said belt part and that are operable to be coupled to each other to position said wrapping member on the support frame.

7. The drone buoyancy device as claimed in claim 6, wherein said fastening member further includes a plurality of ring parts that are spaced apart from each other, that are disposed on said belt part, and that are adapted to be respectively engaged with a plurality of hook members of the drone when said buckle parts are coupled to each other.

8. The drone buoyancy device as claimed in claim 6, wherein said connecting belt is parallel to said belt part of said fastening member.

9. The drone buoyancy device as claimed in claim 6, wherein:

- said actuating member includes a gas cylinder, and a gas outlet portion that is formed with a through hole being in spatial communication with an interior of said inflatable member; and
- said gas outlet portion is operable for introducing a gas in said gas cylinder to flow into said interior of said inflatable member via said through hole.

10. The drone buoyancy device as claimed in claim 9, wherein said gas outlet portion of said actuating member includes:

- a housing that is formed with a water inlet hole;
- a communication rod that extends through said housing, that is connected to said inflatable member, and that is formed with said through hole;
- a spring that is disposed in said housing;
- a needle that is connected to said spring and that extends toward said gas cylinder;
- a limit block that is sleeved on said needle;
- a limit claw that includes a base seat disposed at a junction of said housing and said gas cylinder, and a plurality of resilient claws spaced apart from each other and extending from said base seat toward said spring; and
- a water-soluble tablet that is convertible upon interaction with water from a limit state in which said plurality of resilient claws are bound by said water-soluble tablet so that distal ends of said plurality of resilient claws cooperatively abut against said limit block, to a dissolved state in which said water-soluble tablet is dissolved in water and said plurality of resilient claws resiliently spread, thereby permitting said needle to penetrate said gas cylinder with a resilient force of said spring.

* * * * *